United States Patent Office 2,970,056
Patented Jan. 31, 1961

2,970,056
ANTI-CAKING POWDERED PREPARATION AND METHOD OF PREPARING THE SAME

William L. Benson, Woodbridge, and Raymond J. Lapierre, Iselin, N.J., assignors to Merck & Co., Inc., Rahway, N.J., a corporation of New Jersey No Drawing. Filed Nov. 28, 1958, Ser. No. 776,685

10 Claims. (Cl. 99—143)

This invention relates to the treating of finely divided solid compositions which tend to self-agglomerate, the treating being effective to inhibit this tendency.

It has been proposed heretofore to inhibit caking tendencies of finely divided materials by coating the materials with certain inorganic salts, organo-metallic compounds such as calcium and magnesium stearate, silica and metallic silicates. It has now been discovered that the caking tendency of finely divided solid materials can be inhibited by applying to this material aerated silica gel. The use of aerated silica gel according to the invention is particularly effective when employed to inhibit the caking tendencies of edible and medicinal materials.

Further, it has been found that, in the case of certain finely divided materials of particular compositions, other beneficial effects are realized by the treatment according to the invention. Thus electrostatic properties of butylated hydroxy toluene are improved, and when fruit additive compositions formed of ascorbic acid and a sugar carrier are treated according to the invention, caking tendency is reduced without discoloring the ascorbic acid and without altering the composition so that aqueous solutions thereof are turbid. Many commonly used anti-caking agents when applied to fruit additive compositions cause the undesirable side effects referred to.

Aerated silica gel is generally effective in that it inhibits the caking tendency of finely divided edible and medicinal materials which tend to self-agglomerate and which are coatable with the gel. It is effective, for example, to reduce caking of vitamin containing compositions such as niacin-soya flour mixtures, drum-dried vitamin $B_{12}$ fermentation residue by itself or combined with a carrier, multiple vitamin water-dispersible food and feed supplements containing vitamins and antibiotic values along with a carrier, and water-dispersible vitamin $B_{12}$-carrier food and feed supplement compositions, e.g. vitamin $B_{12}$, sugar composition admixtures. It is also effective to inhibit caking of sugar, salt, urea and hexamine, and, as indicated above, butylated hydroxy toluene and fruit additive compositions.

The aerated silica gel employed to inhibit caking according to the invention is a bulky, white, finely divided material. It has a density of about 6 pounds per cubic foot. When suspended in water, it has a slow settling rate and the suspension has a colloidal like appearance. Weight for weight, it imparts less turbidity to water than do many other anti-caking agents. The aerated silica gel is inert chemically and it is relatively pure silica being formed of in excess of 90% silica and 4–6% volatile matter (water and ethanol). A water slurry of the material has a pH of about 4–5. This material is sold under the brand names Santocel C and Santocel 54 by Monsanto Chemical Company. In general, either of the referred to brands of aerated silica gel can be employed with equal effectiveness. The difference between the two brands is that Santocel 54 contains about 1% by hydrocarbon whereas Santocel C does not contain any hydrocarbon.

The aerated silica gel can be applied to the material having a tendency to cake by dry blending in conventional blending or mixing equipment. The particle size of the aerated silica gel is not critical since blending time can be altered to accommodate different particle size materials. Conveniently, the gel is in finely divided form and it can be a fine powder. The blending should be continued until the aerated silica gel has coated the material treated. Where the material treated is an admixture of two or more materials, if desired, the various materials can be individually introduced into the blending equipment and the admixing and coating performed in one operation.

The amount of aerated silica gel suitable for the purposes of the invention can vary widely and will depend on the composition of the finely divided material to which it is applied. As a practical matter, from a fraction of 1% by weight, say .1%, up to the amount which causes substantial dusting of the treated composition can be used. On this basis the upper limit will usually be less than about 6%. The optimum amount for the material treated can be readily determined by experiment.

Preferred amounts of aerated silica gel are for niacin-soya flour compositions, about 2–3% by weight; for butylated hydroxy toluene about 1% by weight; for fruit additives comprising ascorbic acid and a sugar carrier in the proportion of at least about 3 parts of sugar per part of acid, up to 3% and more preferably about 0.2 to 0.5% by weight; and for vitamin-containing compositions from about 0.5–5% by weight.

As stated above, properties other than self-agglomerating tendencies are improved in the case of treatment of certain finely divided materials. Thus, in the case of butylated hydroxy toluene, which can be used as an antioxidant in feeds, the tendency of the material to acquire electrostatic charges can be significantly reduced. An amount of about 0.25 to 0.5% by weight of the aerated silica gel is effective for this purpose and simultaneously to inhibit caking and about 1% by weight is preferred.

In the case of fruit additive formed of ascorbic acid and a sugar carrier therefor, the advantages are realized that self-agglomeration is inhibited without at the same time altering the material so that the ascorbic acid is discolored and so that aqueous solutions of the fruit additive are undesirably turbid and discolored. Although the proportion of ascorbic acid and sugar carrier are not critical, in general the fruit additive will contain the ascorbic acid and sugar carrier in the proportion of at least 3 parts sugar per part of ascorbic acid. The sugar carrier can be, for example, sucrose or dextrose. In fruit additive compositions wherein dextrose is employed as the carrier, somewhat more aerated silica gel, e.g. two to three times as much, is required to provide results comparable to those obtained in cases where the carrier is sucrose.

Aerated silica gel is highly effective in the respects mentioned when applied to Fruit-Freeze which is Merck brand fruit additive and is formed of about 9% ascorbic acid and about 91% sucrose. For Fruit-Freeze brand fruit additive from .05 to 2.0% by weight of aerated silica gel is effective to provide the improved results with respect to self-agglomeration tendency, turbidity of solutions and discoloration of ascorbic acid. Generally 0.25–0.5% by weight is preferred.

The treatment of the invention will now be described by examples of specific embodiments thereof.

*Example 1*

A first and second sample of material formed of finely divided particles of particle size sub 100 mesh and composed of niacin and soya flour admixture were coated in the manner described hereinbefore, respectively with about 3% by weight of aerated silica gel and about 3% by weight of calcium phosphate. These two samples and an untreated sample were stored at 81% relative humidity for one day and were then tested to determine the relative tendencies toward self-agglomeration. It was found that the aerated gel treated sample had a substantially less tendency toward caking than either of the other samples.

*Example 2*

A sample of finely divided butylated hydroxy toluene of particle size sub 80 mesh was coated with 1% by weight of aerated silica gel. This treatment significantly reduced the tendency of the material to self-agglomerate and reduced to nil the tendency of the material to acquire electrostatic charges.

*Example 3*

To determine the relative effectiveness as anti-caking agents of cornstarch, calcium silicate and aerated silica gel for Fruit-Freeze brand fruit additive of particle size sub 60 mesh and having free flowing properties due to recent treatment in a shaker, samples of the fruit additive were coated, respectively, with 0% (control), 0.5%, 1.0%, 1.5%, 2%, 2.5% and 3% by weight of cornstarch, other samples were, respectively, coated with the same amounts of calcium silicate and other samples were, respectively, coated with the same amounts of Santocel 54 brand aerated silica gel.

It was found that the controls self-agglomerate badly; 2.5%–3% by weight of cornstarch prevents caking but yields turbid solutions; 1% by weight of calcium silicate prevents caking but discolors ascorbic acid in the solid material and also in solution of the solid material and that the aerated silica gel inhibits self-agglomeration, yields solutions having only a small trace of turbidity, and does not discolor the ascorbic acid either in the solid or solutions. For inhibition of caking an amount of 0.5% by weight of the aerated silica gel is equivalent to 1% by weight calcium stearate and 3% by weight of cornstarch.

*Example 4*

To determine the relative effectiveness of aerated silica gel and hydrated silica gel for Fruit-Freeze brand fruit additive of particle size (before and after coating) minus 40 mesh, samples of the fruit additive were coated respectively, with 0% (control), 0.25%, 0.5% and 1.0% by weight of aerated silica gel, and other samples were coated respectively with the same amounts of Hi Sil brand hydrated silica gel (Columbia-Southern Co.). All samples were stored at 81% relative humidity for 24 hours and then dried at 80° C.

The hydrated silica gel was not satisfactorily effective in respect to inhibiting self-agglomeration and had the disadvantage that ascorbic acid was discolored.

The aerated silica gel was effective in that self-agglomeration was inhibited and ascorbic acid was not discolored. The optimum amount of gel was 0.25% by weight, the samples containing 0.5% and 1.0% dusted to an undesirable extent.

*Example 5*

A fruit additive formed of about 10% by weight ascorbic acid and about 90% by weight sucrose was coated with ¼ of 1% of aerated silica gel. Another fruit additive formed of about 10% by weight of ascorbic acid and 90% by weight of dextrose was similarly treated. In each case the treatment reduced the caking tendency of the fruit additive. The reduction was greater in the case of the fruit additive comprising sucrose.

*Example 6*

A sample of finely divided Fruit-Freeze brand fruit additive of particle size sub 40 mesh and coated with 0.25% of Santocel C brand aerated silica gel was tested for toxicity and was found to be non-toxic.

*Example 7*

Samples of vitamin $B_{12}$ drum dried fermentation residue were tested to determine the relative effectiveness of calcium stearate and aerated silica gel. It was found that the latter is substantially more effective than the former.

Amounts of 2% and 3% of calcium stearate were used, and 0.5%, 1%, 2% and 3% by weight of the gel were tested. 0.5% and 1.0% by weight of the gel were the most effective.

*Example 8*

Samples of multiple-vitamin antibiotic food supplements were treated according to the invention. The supplements contained vitamins $B_2$, $B_{12}$, $D_2$ and antibiotics including penicillin. Samples having different carriers were tested. The carriers were molasses solubles, sucrose and dextrose were tested. The amount of aerated silica gel was 1% by weight. The particle size was sub 40 mesh. It was found that the coated material was resistant to caking.

*Example 9*

The effectiveness of the treatment of the invention in treating water dispersible vitamin $B_{12}$ feed supplements was tested. Samples of the following compositions were prepared:

|   |   | Grams |
|---|---|---|
| (A) | Vitamin $B_{12}$ concentrate | 0.572 |
|   | Molasses solubles carrier | 453.028 |
| (B) | Vitamin $B_{12}$ concentrate | 0.572 |
|   | Aerated silica gel | 22.680 |
|   | Molasses solubles carrier | 430.348 |
| (C) | Vitamin $B_{12}$ concentrate | 3.147 |
|   | Aerated silica gel | 11.340 |
|   | Molasses solubles carrier | 11.340 |
|   | Dextrose carrier | 427.773 |

Samples (A) and (B) were milled through a ⅛″ screen and sample (C) through a ¹⁄₁₆″ screen.

It was found that the critical relative humidity for caking for one month storage for each sample (A), (B) and (C) was, respectively, 25–30%, 50–55% and 65–70%.

In the specifications and claims, percentages are in weight percent unless otherwise specified.

What is claimed is:

1. The method of treating finely devided, solid, edible and medicinal materials having a tendency to self-agglomerate, to inhibit said tendency, which comprises applying to the particles of the material a coating of aerated silica gel in an amount within the range from about 0.1 percent to about 6 percent, by weight, of the total.

2. The method of claim 1 wherein the finely divided solid material contains at least one vitamin and the amount of aerated silica gel is within the range from about 0.5 percent to about 5 percent, by weight, of the total.

3. The method of claim 1 wherein the finely divided material comprises butylated hydroxy toluene and the amount of aerated silica gel is about 1 percent, by weight, of the total.

4. The method of claim 1 wherein the finely divided solid material is a fruit additive comprising ascorbic acid and a sugar carrier therefor and the amount of aerated silica gel is within the range from about 0.1 percent to about 3 percent, by weight, of the total.

5. The method of claim 1 wherein the finely divided material is a fruit additive comprising ascorbic acid and sucrose in the proportion of at least about 3 parts sucrose per part of ascorbic acid and the aerated silica gel is present in the amount of up to about 3% by weight.

6. A composition of matter comprising a finely divided solid material having a tendency to self-agglomerate selected from the group consisting of edible materials and medicinal materials, the particles of the material being coated with an amount of aerated silica gel, within the range from about 0.1 percent to about 6 percent, by weight, of said composition, said composition being characterized in having free-flowing properties imparted thereto by the aerated silica gel coating.

7. The composition of claim 6 wherein the finely divided solid material contains at least one vitamin and the amount of aerated silica gel is within the range from about 0.5 percent to about 5 percent, by weight, of said composition.

8. The composition of claim 6 wherein the finely divided material comprises butylated hydroxy toluene and the amount of aerated silica gel is about 1 percent, by weight, of said composition, said composition also being characterized by the substantial freedom from electrostatic effects.

9. The composition of claim 6 wherein the finely divided solid material is a fruit additive comprising ascorbic acid and a sugar carrier therefor and the amount of aerated silica gel is within the range from about 0.1 percent to about 3 percent, by weight, of said composition, said composition also being characterized by substantial freedom from discoloration and by the formation of aqueous solutions free of substantial discoloration and turbidity.

10. The composition of claim 6, wherein the finely divided material is a fruit additive comprising ascorbic acid and sucrose in the proportion of at least about 3 parts sucrose per part of ascorbic acid and the aerated silica gel is present in the amount of up to about 3% by weight, said composition also being characterized by substantial freedom from discoloration and by the formation of aqueous solutions free of substantial discoloration and turbidity.

References Cited in the file of this patent
UNITED STATES PATENTS

| | | |
|---|---|---|
| 1,686,670 | Leo | Oct. 9, 1928 |
| 2,689,166 | Rust et al. | Sept. 14, 1954 |
| 2,843,497 | Stuckey et al. | July 15, 1958 |
| 2,879,161 | Valentine et al. | Mar. 24, 1959 |